(12) United States Patent
Miura

(10) Patent No.: US 8,215,443 B2
(45) Date of Patent: Jul. 10, 2012

(54) EXHAUST PIPE STRUCTURE OF VEHICLE AND VEHICLE

(75) Inventor: Takayoshi Miura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 387 days.

(21) Appl. No.: 12/558,576

(22) Filed: Sep. 14, 2009

(65) Prior Publication Data

US 2010/0078255 A1  Apr. 1, 2010

(30) Foreign Application Priority Data

Sep. 30, 2008  (JP) ................................. 2008-253175

(51) Int. Cl.
*B60K 13/04* (2006.01)
(52) U.S. Cl. ........................................ 180/296; 180/309
(58) Field of Classification Search .................. 180/291, 180/296, 309
See application file for complete search history.

(56) References Cited

U.S. PATENT DOCUMENTS

| | | | | |
|---|---|---|---|---|
| 5,443,578 A | * | 8/1995 | Davis, Jr. ....................... | 280/834 |
| 5,915,495 A | * | 6/1999 | Kerlin et al. ................... | 180/291 |
| 6,719,084 B2 | * | 4/2004 | Kuji et al. ...................... | 180/309 |
| 7,168,516 B2 | * | 1/2007 | Nozaki et al. ................. | 180/68.3 |
| 7,347,490 B2 | * | 3/2008 | Kobayashi et al. ........... | 296/204 |
| 7,798,529 B2 | * | 9/2010 | Sato ................................ | 280/834 |
| 7,984,781 B2 | * | 7/2011 | Nozaki ....................... | 180/69.24 |

FOREIGN PATENT DOCUMENTS

JP  63-106190  5/1988

* cited by examiner

*Primary Examiner* — John Walters
(74) *Attorney, Agent, or Firm* — Ditthavong Mori & Steiner, P.C.

(57) ABSTRACT

An exhaust pipe structure for a vehicle includes a vehicle body frame, a pair of occupant seats, and an exhaust pipe. The occupant seats include a driver's seat and a passenger seat and are disposed side by side in a vehicle width direction in a center frame portion. An internal combustion engine is disposed behind the occupant seats and supported substantially on a center line of the vehicle body in a rear frame portion. The exhaust pipe is connected to the internal combustion engine behind the occupant seats. The exhaust pipe extends outward in the vehicle width direction from the internal combustion engine, thereafter, is bent substantially in a U-shape to extend inward in the vehicle width direction, and then extends substantially onto the center line of the vehicle body. A muffler is connected to the exhaust pipe.

16 Claims, 11 Drawing Sheets

EXHAUST PIPE STRUCTURE OF VEHICLE AND VEHICLE

CROSS-REFERENCE TO RELATED APPLICATIONS

The present application claims priority under 35 U.S.C. §119 to Japanese Patent Application No. 2008-253175, filed Sep. 30, 2008. The contents of this application are incorporated herein by reference in their entirety.

BACKGROUND OF THE INVENTION

1. Field of the Invention

The present invention relates to an exhaust pipe structure of a vehicle and a vehicle.

2. Discussion of the Background

There has heretofore been known an all-terrain vehicle in which an internal combustion engine is disposed in a rear frame portion of a vehicle body frame (refer to, for example, Japanese Patent Application Publication No. Sho 63-106190). In the all-terrain vehicle described in Japanese Patent Application Publication No. Sho 63-106190, an exhaust pipe is attached to a front portion of the internal combustion engine. The exhaust pipe is formed substantially in such a helix as to wind around the internal combustion engine in a space surrounded by the vehicle body frame, and then extends rearward to be connected to a muffler disposed at a rear end of the vehicle.

If the vertical dimension or the width of a vehicle body frame is narrowed for reduction in size of a vehicle having an internal combustion engine disposed in a rear frame portion thereof, the space to arrange an exhaust pipe becomes limited. Hence, in order to secure a required length of such an exhaust pipe as described in Japanese Patent Application Publication No. Sho 63-106190 in this case, the exhaust pipe needs to be arranged by being bent substantially in a helix. Such arrangement of the exhaust pipe, however, causes problems of a complexity in the bending process and an increase in the manufacturing costs.

SUMMARY OF THE INVENTION

According to one aspect of the present invention, an exhaust pipe structure for a vehicle includes a vehicle body frame, a pair of occupant seats, an internal combustion engine, an exhaust pipe, and a muffler. The vehicle body frame of a vehicle body includes a front frame portion, a center frame portion, and a rear frame portion. The front frame portion supports a front-wheel drive system. The center frame portion provides a space for occupants. The rear frame portion supports a rear-wheel drive system. The occupant seats include a driver's seat and a passenger seat and are disposed side by side in a vehicle width direction in the center frame portion. The internal combustion engine is disposed behind the occupant seats and is supported substantially on a center line of the vehicle body in the rear frame portion. The exhaust pipe is connected to the internal combustion engine behind the occupant seats. Through the exhaust pipe, a combustion gas generated by combustion in the internal combustion engine is exhausted. The exhaust pipe extends outward in the vehicle width direction from the internal combustion engine, thereafter, the exhaust pipe is bent substantially in a U-shape to extend inward in the vehicle width direction, and the exhaust pipe then extends substantially onto the center line of the vehicle body. The muffler is connected to the exhaust pipe.

According to another aspect of the present invention, a vehicle includes a front-wheel drive system, a rear-wheel drive system, a vehicle body frame, a pair of occupant seats, an internal combustion engine, an exhaust pipe, and a muffler. The vehicle body frame of a vehicle body includes a front frame portion, a center frame portion, and a rear frame portion. The front frame portion supports the front-wheel drive system. The center frame portion provides a space for occupants. The rear frame portion supports the rear-wheel drive system. The occupant seats include a driver's seat and a passenger seat and are disposed side by side in a vehicle width direction in the center frame portion. The internal combustion engine is disposed behind the occupant seats and is supported substantially on a center line of the vehicle body in the rear frame portion. The exhaust pipe is connected to the internal combustion engine behind the occupant seats. Through the exhaust pipe, a combustion gas generated by combustion in the internal combustion engine is exhausted. The exhaust pipe extends outward in the vehicle width direction from the internal combustion engine, thereafter, the exhaust pipe is bent substantially in a U-shape to extend inward in the vehicle width direction, and the exhaust pipe then extends substantially onto the center line of the vehicle body. The muffler is connected to the exhaust pipe.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
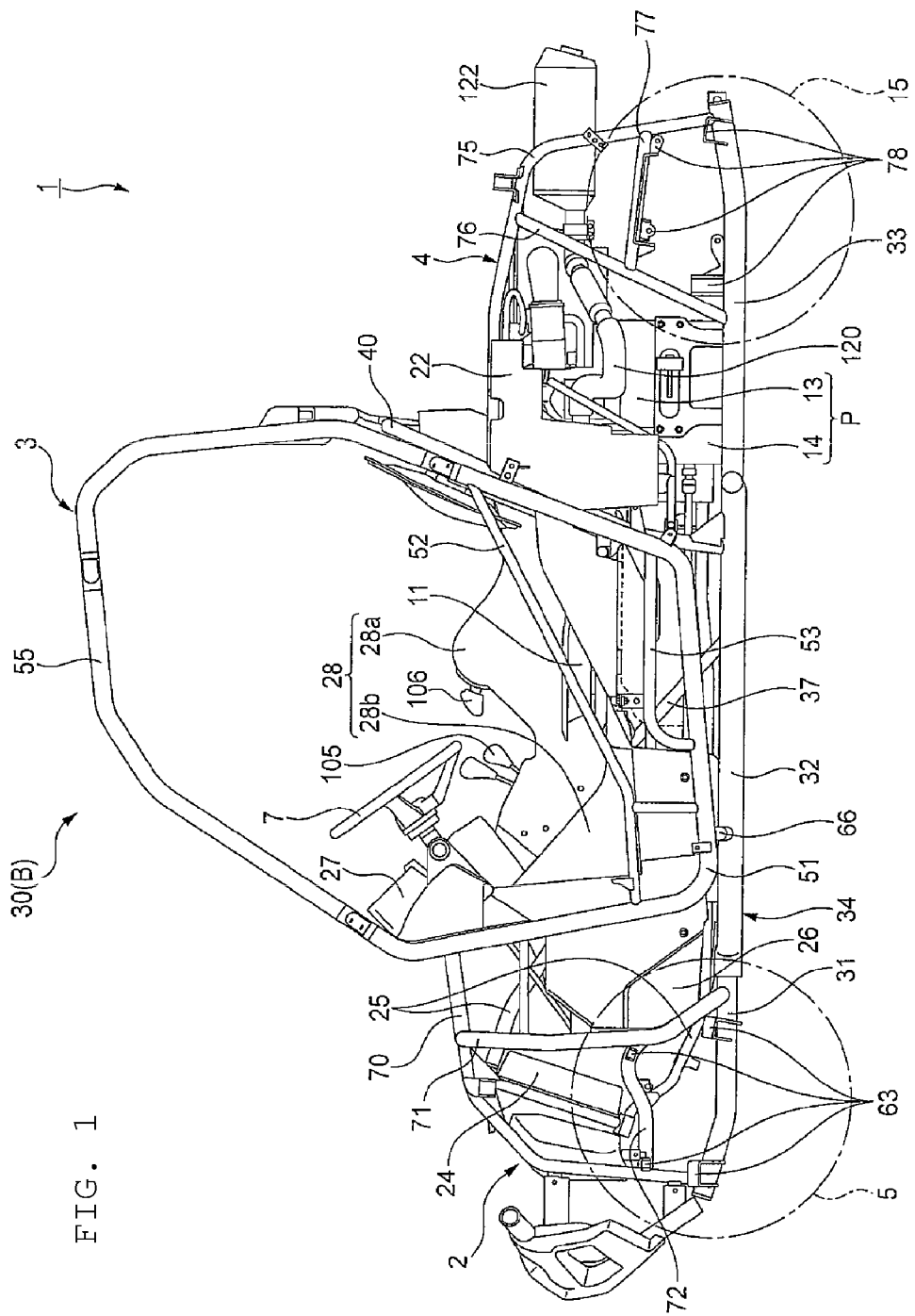
FIG. 1 is a left-side view of a vehicle employing an exhaust pipe structure for a vehicle according to an embodiment of the present invention.

The embodiments will now be described with reference to the accompanying drawings, wherein like reference numerals designate corresponding or identical elements throughout the various drawings.

Hereinafter, an exhaust pipe structure for a vehicle according to an embodiment of the present invention will be described by giving an MUV (multi utility vehicle) as an example. Note that the drawings should be viewed in the direction of orientation of reference numerals.

Figure 2:
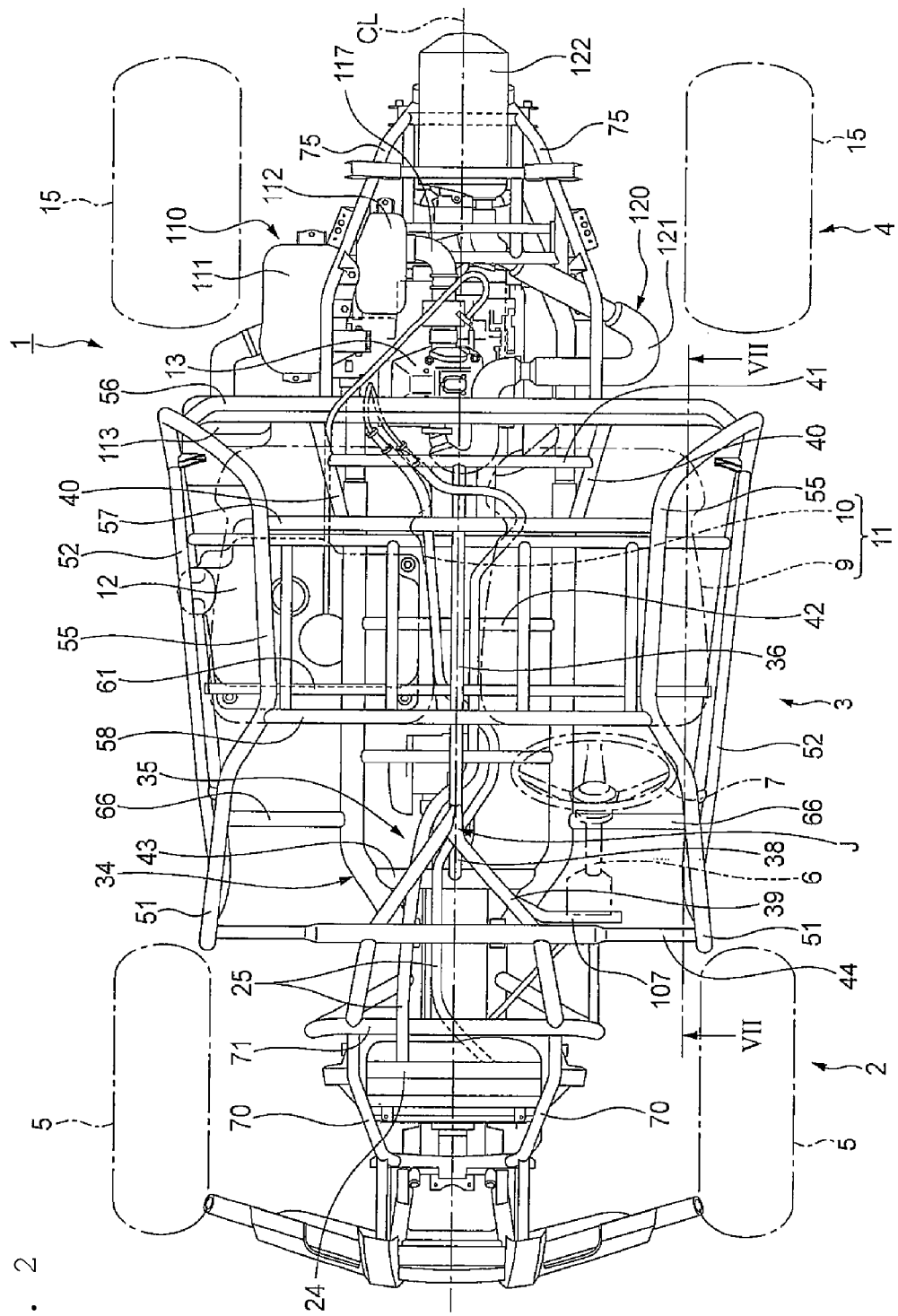
FIG. 2 is a plan view of the vehicle illustrated in FIG. 1.
Figure 3:
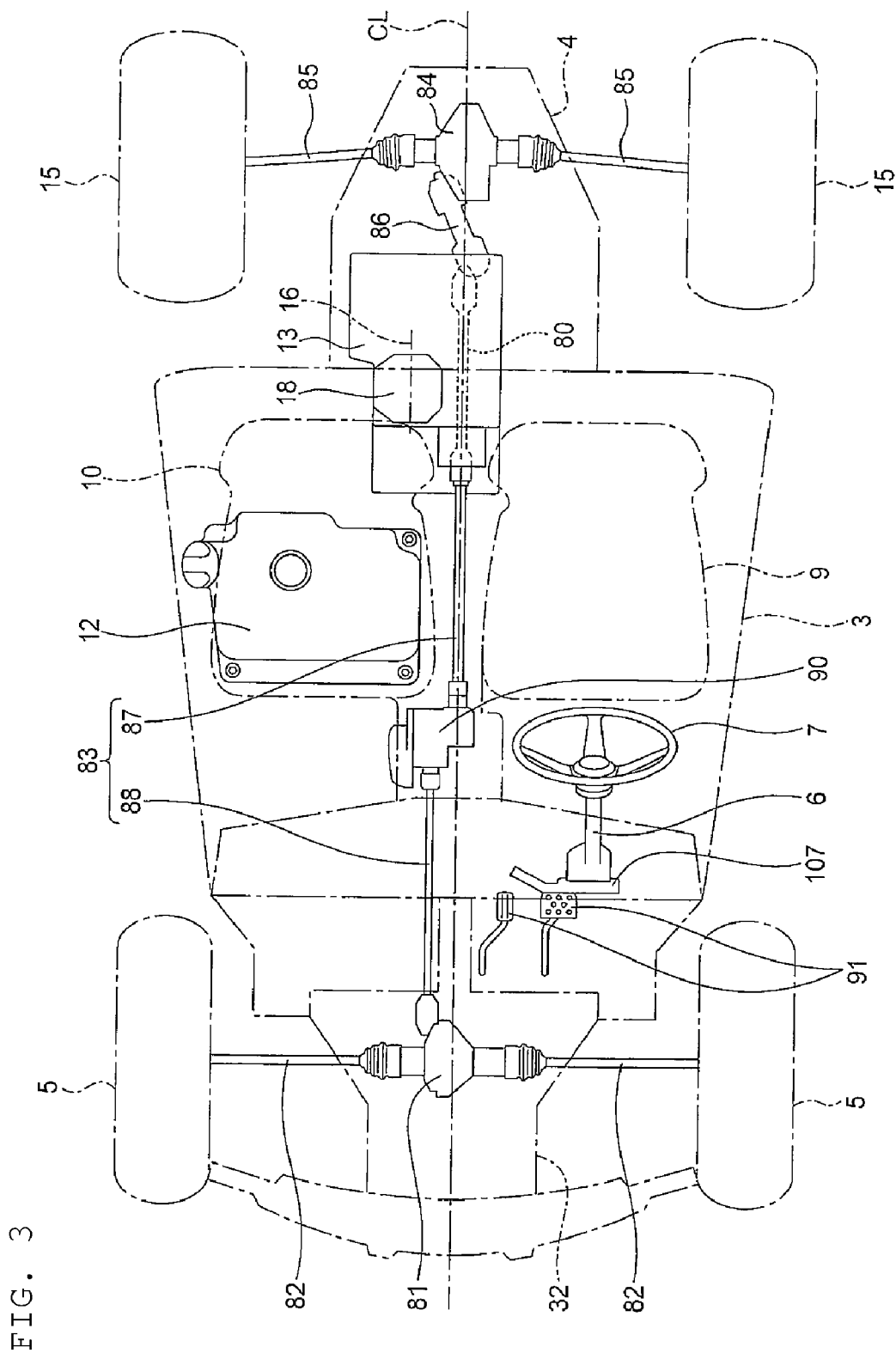
FIG. 3 is a plan view of chief parts of a power transmission mechanism of the vehicle illustrated in FIG. 1.

As illustrated in FIGS. 1 to 3, a vehicle 1 according to the embodiment includes a vehicle body frame 30 which includes a front frame portion 2, a center frame portion 3, and a rear frame portion 4 so as to constitute a vehicle body B. A front-wheel suspension system (not illustrated) which suspends left and right front wheels 5 is attached to the front frame portion 2. In addition, a front-wheel drive system including a front differential gear unit 81, front drive shafts 82, and the like; steering members (including a steering shaft 6 and a steering wheel 7 attached to an upper end of the steering shaft 6) for steering the front wheels 5; and the like are supported on the front frame portion 2.

A pair of occupant seats 11, constituting a driver's seat 9 and a passenger seat 10 arranged side by side in a vehicle width direction, are attached to the center frame portion 3, so that a space for occupants is formed. A fuel tank 12 is disposed in a space below the passenger seat 10. A front propeller shaft 83 coupling a power unit P and a front differential gear unit 81 is disposed between the driver's seat 9 and the passenger seat 10.

A rear-wheel suspension system (not illustrated) which suspends left and right rear wheels 15 is attached to the rear frame portion 4. In addition, a rear-wheel drive system including, for example, a rear propeller shaft 86, a rear differential gear unit 84, rear drive shafts 85; and the like are supported on the rear frame portion 4 in addition to the power unit P including an internal combustion engine 13 and a transmission 14.

As illustrated in FIG. 3, the power unit P supported on the rear frame portion 4 is laid out vertically in such a manner that a crankshaft 16 of the internal combustion engine 13 is directed in a front-rear direction of the vehicle body. An output shaft 80 to which a driving force is transmitted from the crankshaft 16 is disposed substantially on a center line CL of the vehicle body. The output shaft 80 is coupled at a front end thereof to the front propeller shaft 83 and is coupled at a rear end thereof to the rear propeller shaft 86.

The rear propeller shaft 86 is connected to the rear differential gear unit 84 disposed substantially on the center line CL of the vehicle body. The driving force of the internal combustion engine 13 is transmitted to the left and right rear wheels 15 via the rear propeller shaft 86, the rear differential gear unit 84, and then the rear drive shafts 85 connected to the rear differential gear unit 84.

The front propeller shaft 83 is provided with a reduction gear 90 at an intermediate portion of the front propeller shaft 83. The front propeller shaft 83 is constituted of a first propeller shaft 87 and a second propeller shaft 88. The first propeller shaft 87 is disposed at the rear of the reduction gear 90, while the second propeller shaft 88 is disposed at the front of the reduction gear 90. The reduction gear 90 transmits the rotational force of the first propeller shaft 87 to the second propeller shaft 88 while converting the rotational direction of the first propeller shaft 87 into the reverse direction in order to rotate the front wheels 5 and the rear wheels 15 in the same direction. Accordingly, the driving force of the internal combustion engine 13 is transmitted to the left and right front wheels 5 via the first propeller shaft 87, the reduction gear 90, the second propeller shaft 88, the front differential gear unit 81, and then the front drive shafts 82 connected to the front differential gear unit 81.

Figure 8:
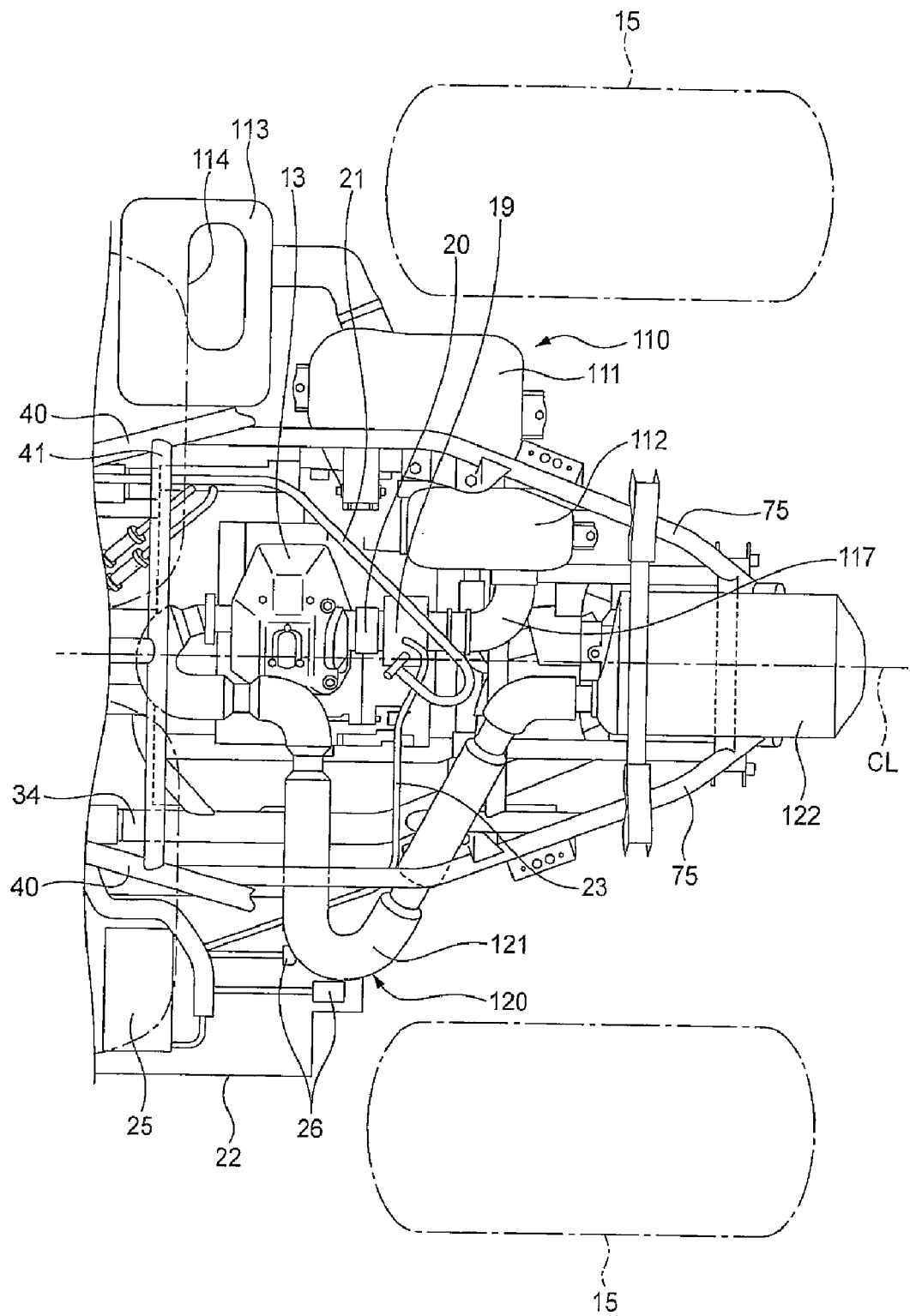
FIG. 8 is a plan view illustrating, in an enlarged manner, rear chief parts illustrated in FIG. 2.

As illustrated in an enlarged manner in FIG. 8, a throttle valve unit 19 is connected to a rear portion of a cylinder head 18 of the internal combustion engine 13 via an intake manifold 20. An exhaust pipe 120, which will be described later, is connected to a front portion of the cylinder head 18. An air cleaner 110 including first and second air cleaner chambers 111 and 112, which will be described later, is connected to a rear portion of the throttle valve unit 19 via a connecting tube 117. Moreover, a fuel supply pipe 21 and a wire harness 23 are connected to the throttle valve unit 19. The fuel supply pipe 21 extends from the fuel tank 12. The wire harness 23 is arranged to extend from a battery case 22 including the battery case 22, an ECU 26, and the like.

Figure 4:
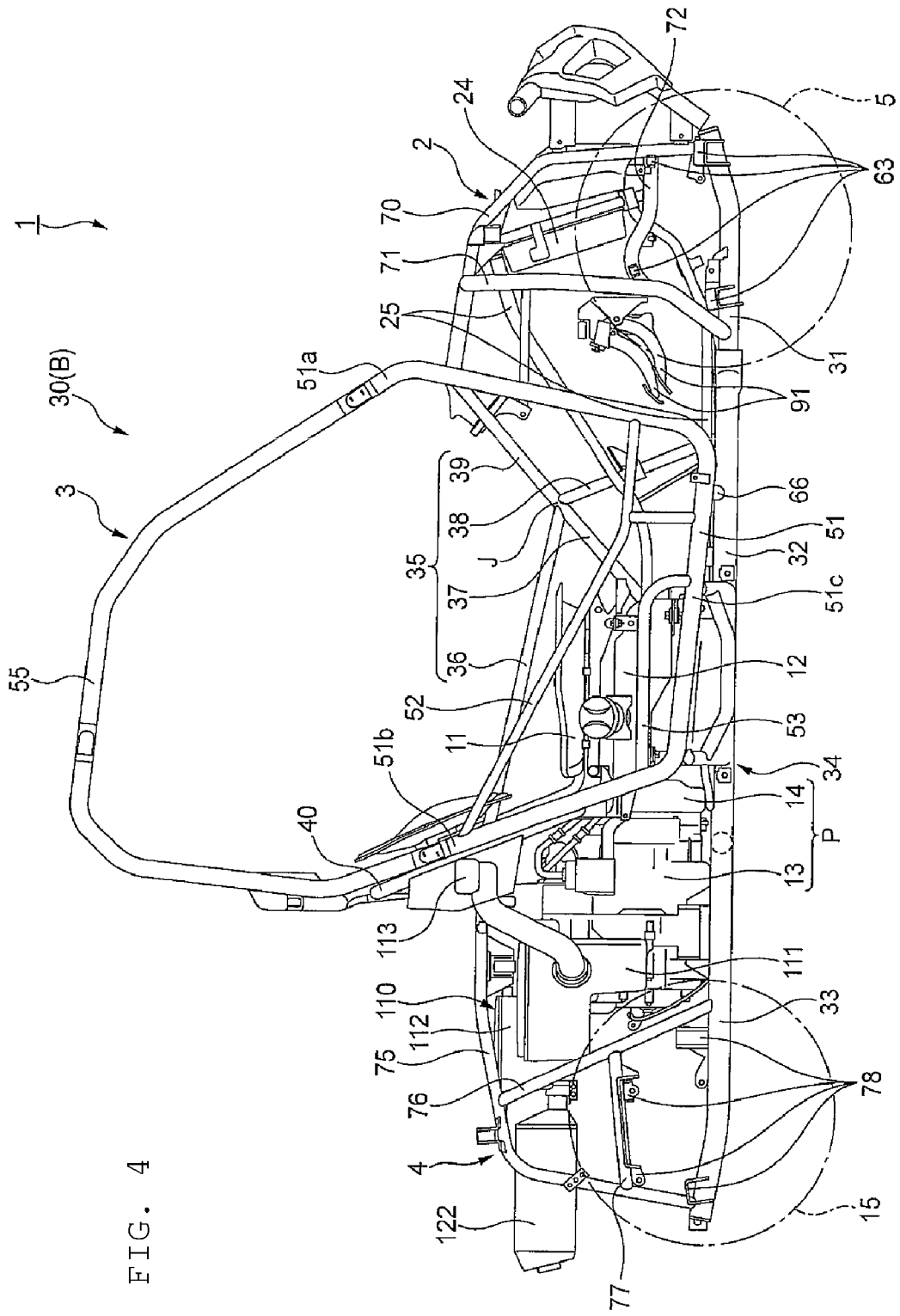
FIG. 4 is a right-side view of the vehicle illustrated in FIG. 1.

Moreover, as illustrated in FIGS. 2 and 4, a radiator 24 disposed in the front frame portion 2 is connected to the internal combustion engine 13 via two water supply pipes 25. Thus, cooling water for cooling the internal combustion engine 13 circulates between the radiator 24 and the internal combustion engine 13 through the water supply pipes 25.

Note that, in FIG. 1, reference numeral 26 denotes a front cover; reference numeral 27 denotes an instrument panel; reference numeral 28 denotes a center console cover including a center cover member 28a as well as a pair of left and right cover members 28b.

Figure 5:
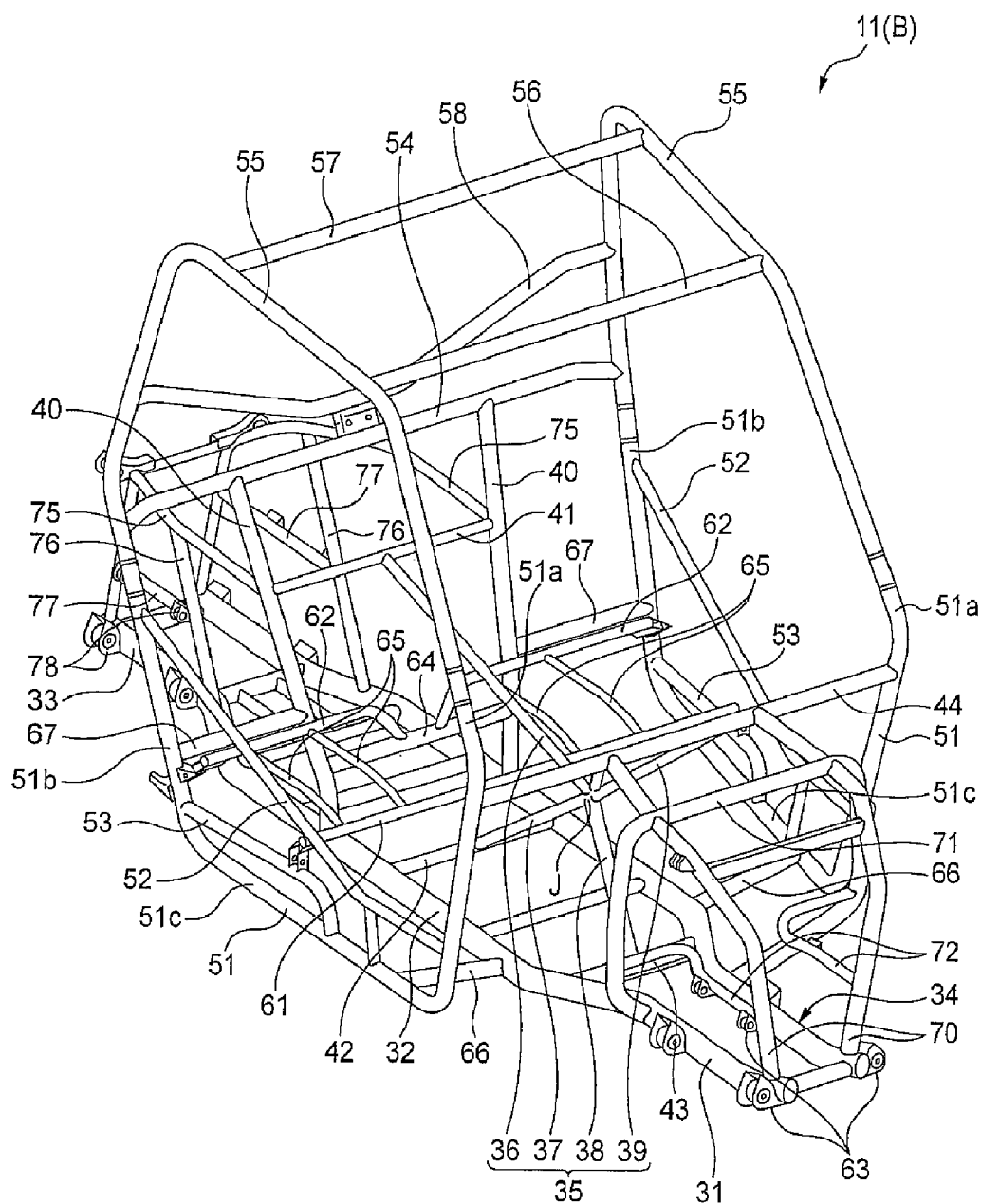
FIG. 5 is a perspective view illustrating a frame structure of the vehicle illustrated in FIG. 1.
Figure 6:
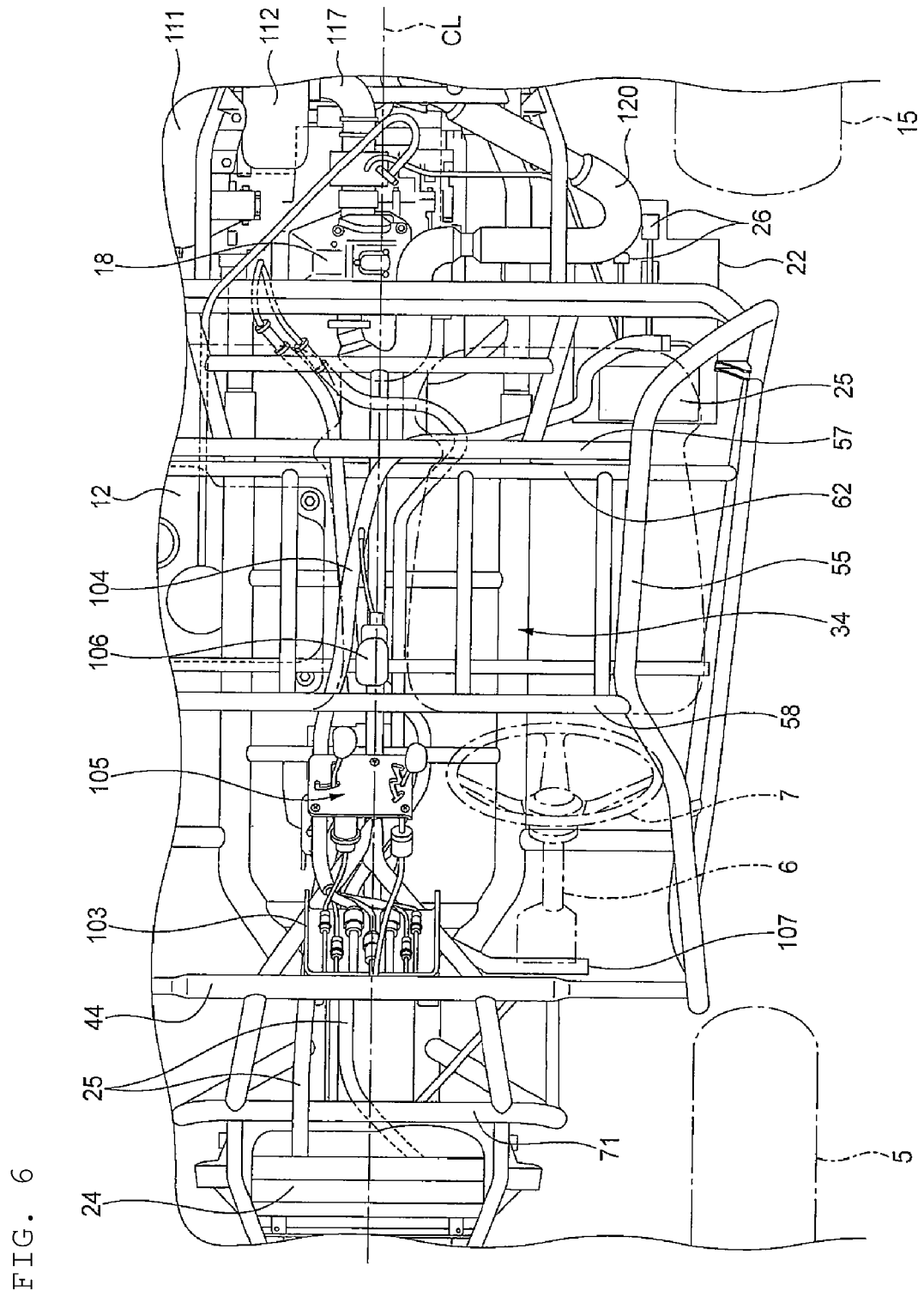
FIG. 6 is a plan view illustrating, in an enlarged manner, chief parts where wires are arranged.

As illustrated in FIGS. 4 and 5, the vehicle body frame 30 includes a pair of lower frames 34 disposed respectively in left and right lower portions of the vehicle body B and extending in the front-rear direction. Each of the lower frames 34 forms a front lower frame 31, a center lower frame 32, and a rear lower frame 33.

In the front frame portion 2, a pair of left and right front upper frames 70 extend upward from front ends of the respective front lower frames 31, further extend rearward, and then are joined to a front upper cross-member 44. In this manner, the left and right front upper frames 70 cover a front portion of the vehicle body B from above. The front lower frames 31 and the front upper frames 70 are coupled to one another by a square U-shaped frame 71.

In addition, rising portions of the square U-shaped frame 71 are coupled respectively to rising portions of the front upper frames 70 by front-suspension support pipes 72 each formed into a substantially L-shape. Two brackets 63 are fixed onto each of the front lower frames 31 and the front-suspension support pipes 72, and the front-wheel suspension system is swingably disposed on the brackets 63. The front-wheel suspension system rotatably suspends the left and right front wheels 5.

On the other hand, in the rear frame portion 4, a pair of left and right rear upper frames 75 extend upward from rear ends of the rear lower frames 33, thereafter are bent to extend frontward in such a manner as to cover the power unit P including the internal combustion engine 13, and then are joined respectively to a pair of center upright frames 40. The center upright frames 40 extend upward from portions, behind the occupant seats 11, of the respective center lower frames 32. Horizontal portions of the rear upper frames 75 are vertically connected to the rear lower frames 33 respectively by rear upright frames 76, each of which is inclined frontward while extending downward. Moreover, the rear upright frames 76 are connected respectively to perpendicular portions of the corresponding rear upper frames 75 respectively by rear-suspension support pipes 77.

Two brackets 78 are fixed respectively onto front and rear portions of each of the rear lower frames 33 and the rear-suspension support pipes 77. The rear-wheel suspension system is swingably disposed on the four brackets 78 in total. The rear-wheel suspension system suspends the left and right rear wheels 15 in a manner that the rear wheels 15 are rotatable.

In the center frame portion 3, a pair of left and right side frames 51, which extend in the front-rear direction, are disposed respectively outside the center lower frames 32 in the vehicle width direction. The side frames 51 are joined to the respective lower frames 34 by connecting pipes 66 and connecting pipes 67. The connecting pipes 66 are connected to front portions of the respective center lower frames 32, while the connecting pipes 67 are connected to intermediate portions of the respective center upright frames 40.

Each of the side frames 51 includes a front rising portion 51a, a rear rising portion 51b, and a horizontal portion 51c joining the front and rear rising portions 51a and 51b, and is thus formed in a substantially square U-shape, which is convex downward.

In each of the substantially square U-shaped side frames 51, the front rising portion 51a and the rear rising portion 51b are coupled to each other by a side pipe 52 in the front-rear direction. End portions of the respective front rising portions 51a of the pair of side frames 51 are coupled to each other by the front upper cross-member 44 in the vehicle width direction. Middle portions of each rear rising portion 51b and the corresponding horizontal portion 51c are coupled to each other by a seat supporting pipe 53 having a substantially L shape.

A pair of side upper frames 55, each formed into a substantially square U shape, are each connected to the front rising portion 51a and the rear rising portion 51b of a corresponding one of the pair of side frames 51 in such a manner that the side upper frame 55 is convex upward. The pair of side upper frames 55 are coupled to each other in the vehicle width direction by: a first upper cross-member 54, to which the pair of center upright frames 40 are joined at upper end portions thereof; two roof cross-members 56 and 57; and a cross-member 58 for headrest, which is joined at a middle portion thereof to the first upper cross-member 54.

A first seat cross-member 61 is laid between the pair of seat supporting pipes 53 with brackets therebetween. In addition, a pair of second seat cross-members 62 are joined to the rear rising portions 51b of the respective side frames 51 with brackets therebetween. The second seat cross-members 62 are joined to a rear cross-member 64 which connects the pair of center upright frames 40 to each other at portions lower than the middle portions thereof. The first and second seat cross-members 61 and 62 as well as coupling frames 65, which couple the respective second seat cross-members 62 to the first seat cross-member 61 in the front-rear direction, constitute seat frames. Seat pipes 60 (refer to FIG. 9) for the driver's seat 9 and the passenger seat 10 are attached to the seat frames.

In addition, in the center frame portion 3, a center pipe 35 is provided. The center pipe 35 passes between the driver's seat 9 and the passenger seat 10 and is arranged above the lower frames 34 to extend in the front-rear direction substantially on the center line CL of the vehicle body. Accordingly, the center frame portion 3 has a structure in which the center pipe 35 and the pair of lower frames 34 are disposed respectively on the upper and lower sides in the center portion in the vehicle width direction, and the side pipe 52 and the side frame 51 are disposed on the upper and lower sides in each of the side portions. This structure makes it possible to improve the rigidity of the center frame portion 3 as well as to achieve a low floor and a low center of gravity.

Figure 7:
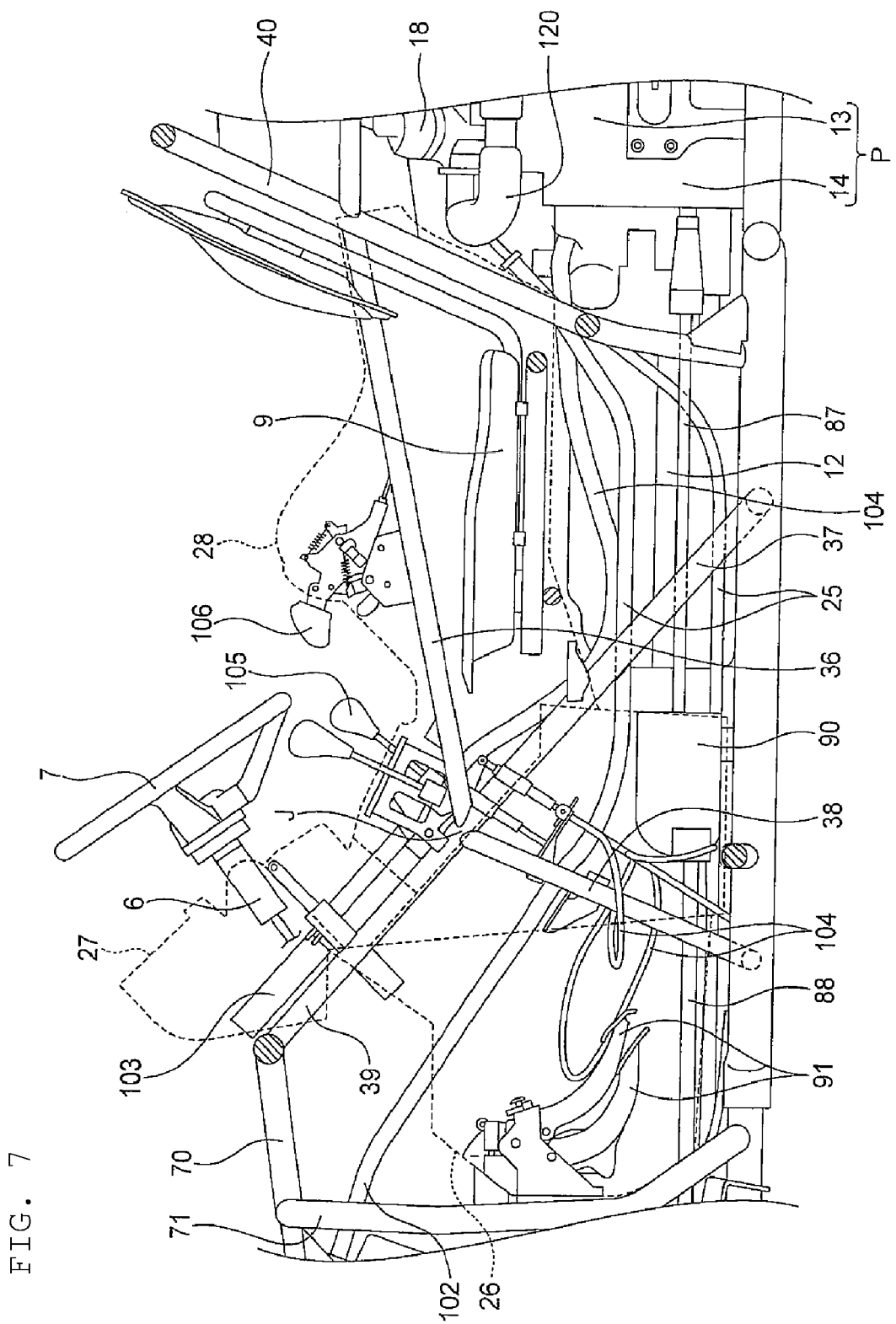
FIG. 7 is a side view taken along the line VII-VII in FIG. 2, and illustrating, in an enlarged manner, an inside of a center console cover.

As illustrated in an enlarged manner also in FIG. 7, the center pipe 35 includes an upper center pipe 36, a down center pipe 37, an upright center pipe 38, and a front center pipe 39. These members 36, 37, 38, and 39 are joined together at a joint point J located in front of the occupant seats 11.

The upper center pipe 36 extends frontward while being joined at one end thereof to a center portion of a rear upper cross-member 41 which couples the pair of center upright frames 40 to each other. The down center pipe 37 extends upward and frontward while being joined at one end thereof to a center portion of a rear lower cross-member 42 which is laid between the center lower frames 32 at a position below the occupant seats 11.

The upright center pipe 38 extends rearward and upward while being joined at one end thereof to a center portion of a front lower cross-member 43 which is laid between the center lower frames 32 at a position in front of the occupant seats 11. The front center pipe 39 is a pipe member that is formed into a substantially V shape with two branches extending frontward respectively to the left and right from the joint point J as the base point. An end portion of each of the left and right branches is joined to the front upper cross-member 44 in a vicinity of the joint portion of a corresponding one of the front upper frames 70 to the front upper cross-member 44.

On the center pipe 35 constituted as described above, a shift lever 105 is attached to a portion above a vicinity of the joint point J having increased rigidity, and a side-brake lever 106 is attached to a portion above an intermediate portion of the upper center pipe 36. Note that, the steering shaft 6, which is a steering member, is attached to the front upper cross-member 44 with a subframe 107 interposed therebetween. Wires extend from the shift lever 105, the side-brake lever 106, and the steering shaft 6, as well as from foot controls 91, such as a brake pedal and an acceleration pedal, disposed on the driver's seat 9 side, and the like. These extending wires are gathered in an electric connection box 103, and then bundled into a single wire harness 104, which is eventually connected to the battery case 22 provided behind the driver's seat 9.

In addition, as illustrated in FIGS. 2, 3 and 7, the first propeller shaft 87 is located below and along the center pipe 35 substantially on the center line CL of the vehicle body. The first propeller shaft 87 is disposed also in such a manner as to overlap the fuel tank 12 in a side view, in other words, in such a manner that the first propeller shaft 87 and the fuel tank 12 are arranged side by side in the vehicle width direction. The second propeller shaft 88 connected to the reduction gear 90 is disposed offset toward the passenger seat 10 in the vehicle width direction with respect to the first propeller shaft 87. Moreover, the second propeller shaft 88 is coupled, on the passenger seat 10 side, to the front differential gear unit 81 disposed substantially on the center line CL of the vehicle body above the front lower frames 31.

As described above, since the front propeller shaft 83 is arranged substantially along the center pipe 35, the torsion in the vehicle 1 is unlikely to act on the front propeller shaft 83. In addition, since the second propeller shaft 88 is disposed offset toward the passenger seat 10 in the vehicle width direction, a large space for occupants can be secured even with the lowered floor, and also, the flexibility in layout of the foot controls 91 is improved, so that the foot controls 91 can be disposed at positions where the foot controls 91 are easily operated.

Moreover, the reduction gear 90 is located in front of the pair of occupant seats 11, and also behind the foot controls 91, such as the brake pedal and acceleration pedal, disposed on the driver's seat 9 side, and is disposed between the down center pipe 37 and the upright center pipe 38.

The two water supply pipes 25, which connect the radiator 24 and the internal combustion engine 13, as well as the wire harness 104, which electrically connects the electric connection box 103 and the battery case 22, are also disposed offset toward the passenger seat 10 side in the vehicle width direction, partially in a region in front of the upright center pipe 38, as in the case of the front propeller shaft 83.

Accordingly, the center console cover 28 provided between the driver's seat 9 and the passenger seat 10 houses the center pipe 35, the front propeller shaft 83, the reduction gear 90, the water supply pipes 25, the wire harness 104, the shift lever 105, and the side brake lever 106, while a front portion of the center console cover 28 is offset toward the passenger seat 10 side.

With this arrangement, the water supply pipes 25 and the wire harness 104 are compactly arranged by utilizing the dead space. As a result, a large space for occupants can be secured, and also, the flexibility in layout of the foot controls 91 is improved, so that the foot controls 91 can be disposed at positions where the foot controls 91 are easily operated.

Further, while the vehicle body frame 30 is formed in a bilaterally symmetrical arrangement, the front differential gear unit 81, the reduction gear 90, the internal combustion engine 13, the rear differential gear unit 84, and the like, which are major heavy components, are disposed substantially on the center line CL of the vehicle body. As a result, a favorable weight balance between the left and right sides is achieved to increase the stability of the vehicle 1.

Figure 9:
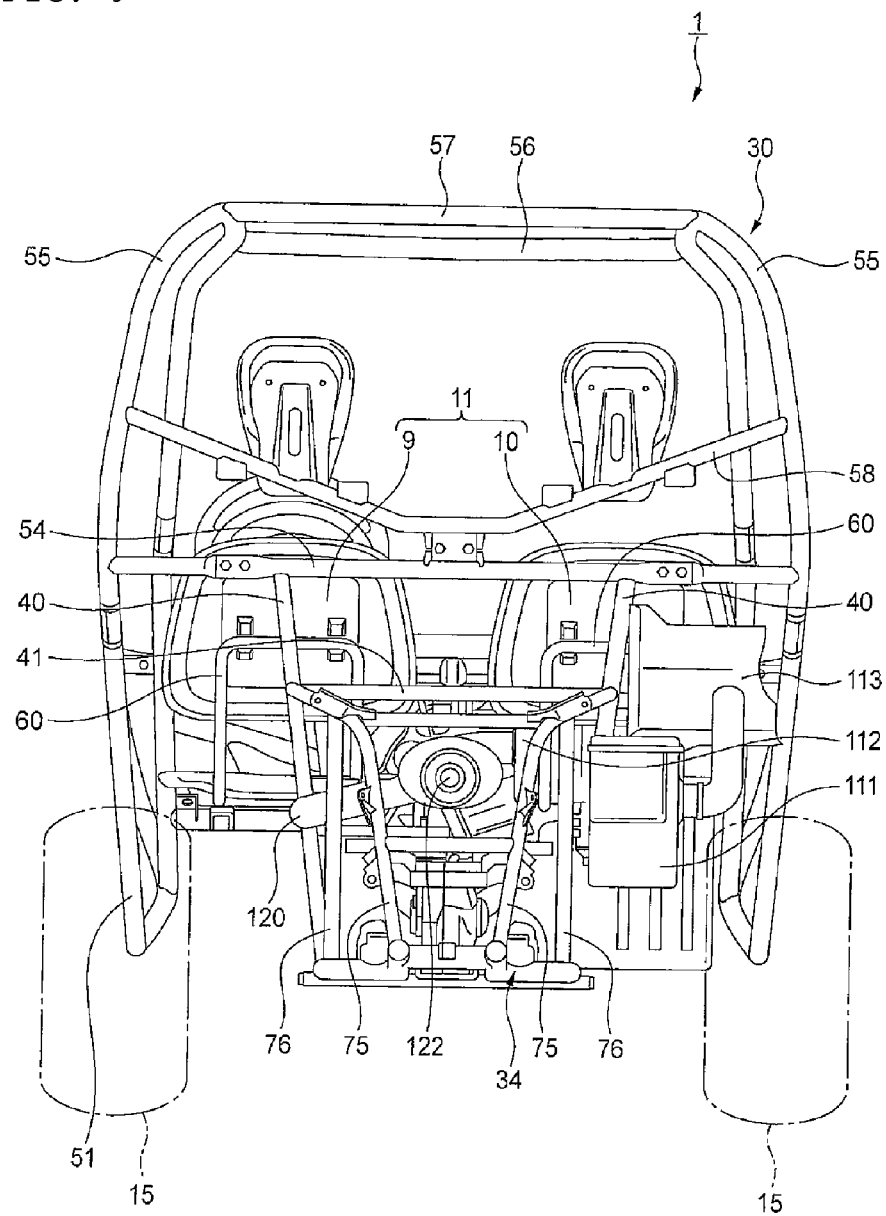
FIG. 9 is a rear view of the vehicle illustrated in FIG. 1.
Figure 10:
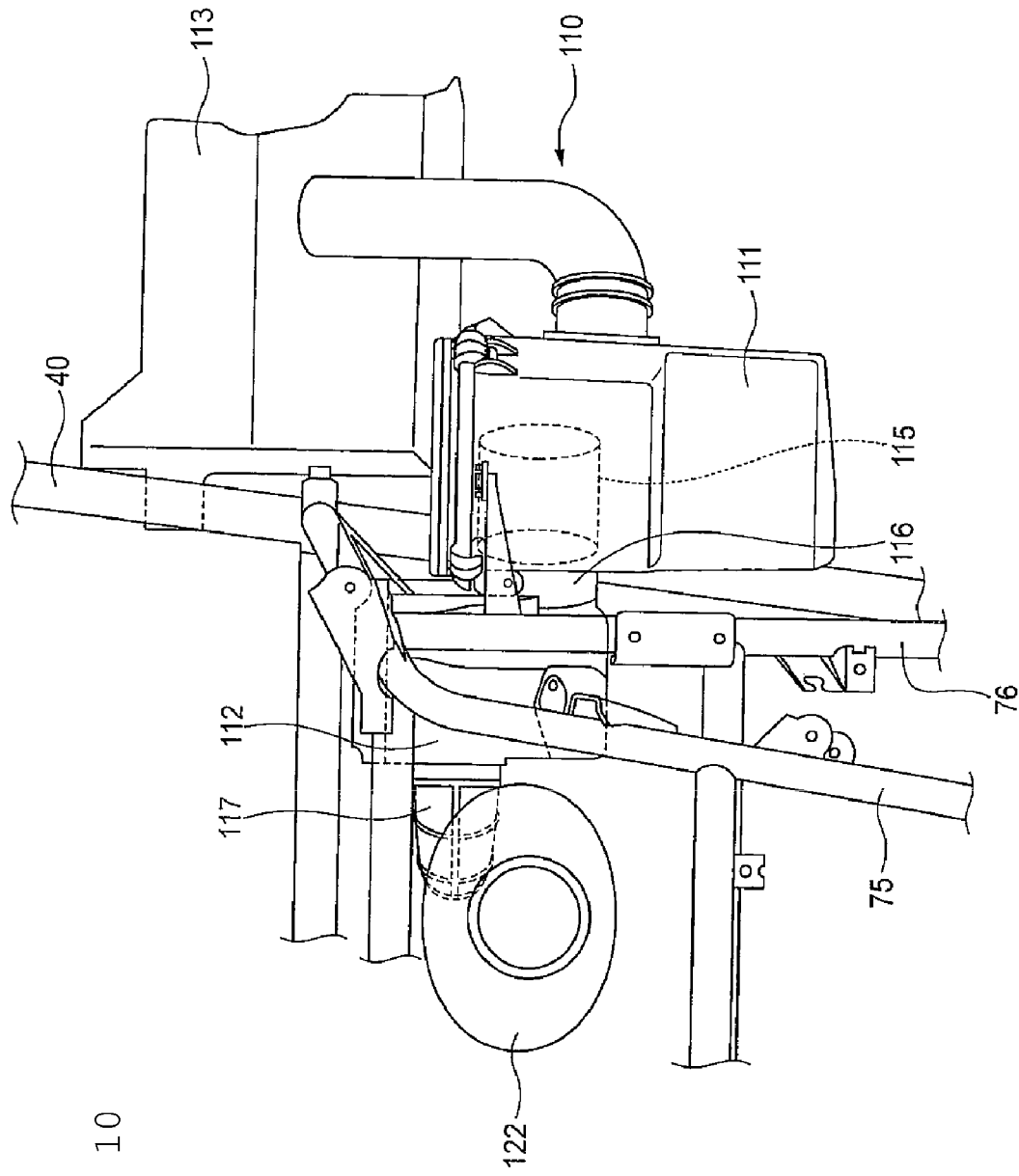
FIG. 10 is a rear view illustrating, in an enlarged manner, chief parts of an intake structure illustrated in FIG. 9.

As illustrated in FIGS. 8 to 10, the air cleaner 110 constituting an intake system, is disposed behind the passenger seat 10 on the right side of the internal combustion engine 13, and includes the first air cleaner chamber 111 and the second air cleaner chamber 112.

A snorkel 113 is connected to the first air cleaner chamber 111 via a duct attached to an outer side surface of the first air cleaner chamber 111 in the vehicle width direction. The snorkel 113 is disposed behind the passenger seat 10 and has a cover 114 for covering its opening. The first air cleaner chamber 111 and the second air cleaner chamber 112 face each other in the vehicle width direction with the rear upright frame 76 on the corresponding side being partially sandwiched therebetween, and communicate with each other via a coupling tube 116. In addition, the second air cleaner chamber 112 is connected to the internal combustion engine 13 via the connecting tube 117.

Accordingly, the first air cleaner chamber 111 is disposed outside the corresponding rear upright frame 76 in the vehicle width direction, and the second air cleaner chamber 112 is disposed inside the rear upright frame 76 in the vehicle width direction. In addition, an air cleaner element 115 for removing dust in the air is housed in the first air cleaner chamber 111.

In the air cleaner 110 as described above, external air is introduced from the snorkel 113; then dust in the air thus introduced is removed by the air cleaner element 115 in the first air cleaner chamber 111; the purified air is guided to the second air cleaner chamber 112 through the coupling tube 116, and thereafter, is supplied to the internal combustion engine 13 from the connecting tube 117.

Since the air cleaner 110 is constituted of: the first air cleaner chamber 111 disposed outward of the corresponding lower frame 34 in the vehicle width direction and the second air cleaner chamber 112 disposed inward thereof in the vehicle width direction. Accordingly, the air cleaner 110 having a large capacity can be compactly disposed in a narrow space surrounded by the frames. In addition, since the first air cleaner chamber 111 is disposed outward of the corresponding rear upright frame 76 in the vehicle width direction, a large space for maintenance of the air cleaner 110 can be secured. For this reason, a maintenance operation can be easily performed on the air cleaner 110, that is, the air cleaner 110 has an excellent maintainability.

It should be noted that the above-described effect can be obtained even when the first and second cleaner chambers 111 and 112 are disposed to sandwich a part of the corresponding lower frame 34 or of the corresponding rear upper frame 75 instead of the rear upright frame 76, in accordance with the position where these chambers 111 and 112 are attached.

Figure 11:
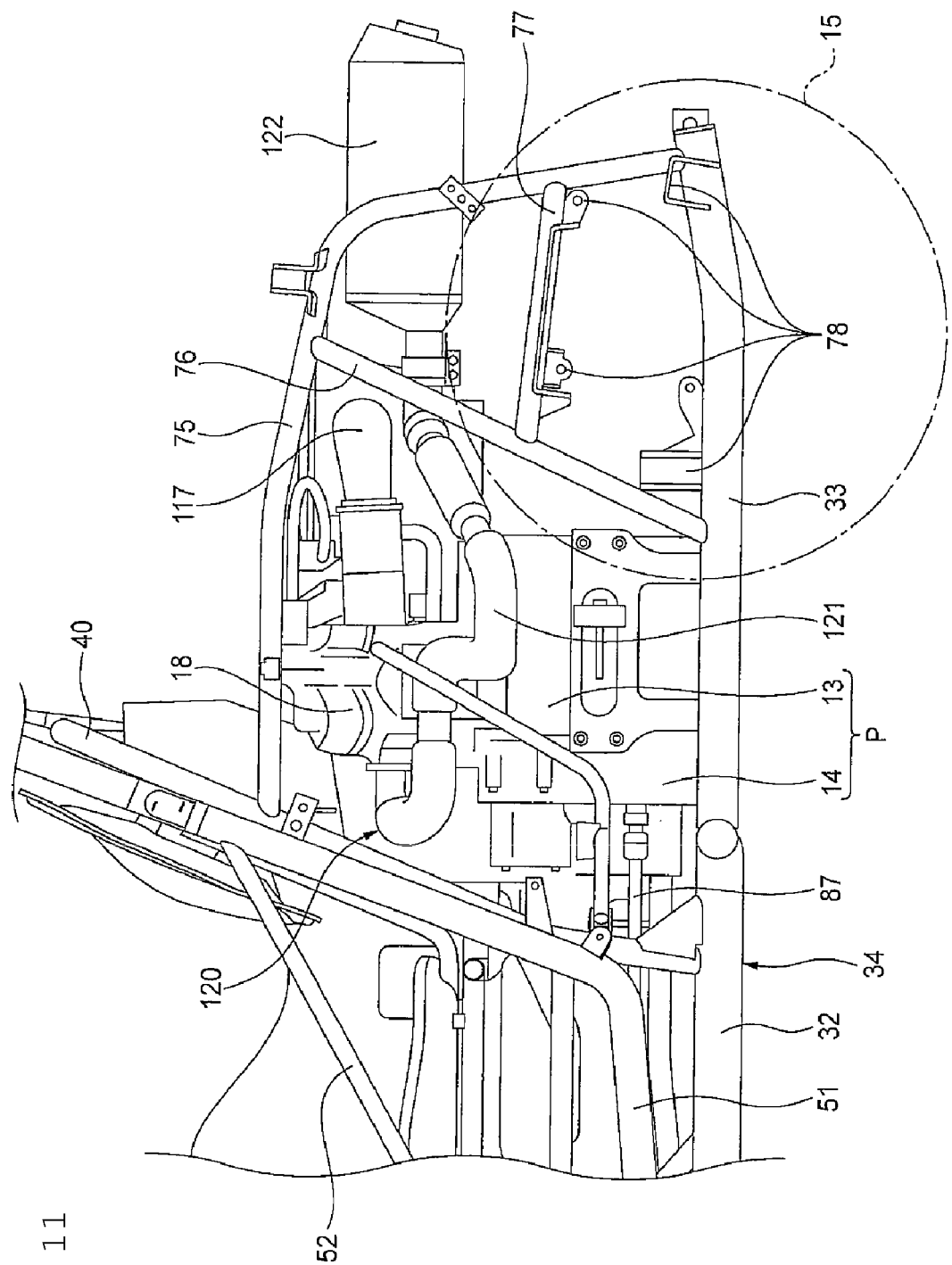
FIG. 11 is a side view illustrating, in an enlarged manner, a rear frame portion illustrated in FIG. 1.

Moreover, as illustrated in FIGS. 8 and 11, the exhaust pipe 120 connected to the front portion of the cylinder head 18 first extends frontward, thereafter turns around and extends rearward, is further bent at substantially 90°, and rectilinearly extends to the outside of the vehicle body while being inclined downward with respect to the horizontal plane. Moreover, after reaching a region behind the driver's seat 9 in the vehicle width direction, the exhaust pipe 120 is bent to the inside of the vehicle body and linearly extends back substantially onto the center line CL of the vehicle body while being inclined upward, and is then connected to a muffler 122 disposed to extend in the front-rear direction substantially on the center line CL of the vehicle body in the rear frame portion 4. With this arrangement, an outermost extending portion 121 of the exhaust pipe 120 extends to a region inside a rearward extension line of the corresponding side frame 51 in the vehicle width direction and outside the corresponding rear upper frame 75 in the vehicle width direction.

Accordingly, a required length can be secured for the exhaust pipe 120 by utilizing the dead space even in, for example, the vehicle 1 having the lowered floor, in which the space in the rear frame portion 4 is limited with the internal combustion engine 13 disposed behind the occupant seats 11. Moreover, having many straight portions, the exhaust pipe 120 can be easily processed, so that the number of assembly processes can be reduced and that the manufacturing costs thus can be suppressed.

The outermost extending portion 121 of the exhaust pipe 120 extends to the region inside the rearward extension line of the corresponding side frame 51 in the vehicle width direction and outside the corresponding rear upper frame 75 in the vehicle width direction. With this arrangement, the exhaust pipe 120 is protected while the length of the exhaust pipe 120 is sufficiently secured.

In addition, since the exhaust pipe 120 passes the region closer to the center of the vehicle body than the corresponding rear upright frame 76 and then extends back substantially onto the center line CL of the vehicle body, the dead space in the rear-wheel suspension system disposed behind the rear upright frames 76 can be effectively utilized.

As described above, in the exhaust pipe structure of a vehicle according to the embodiment, the exhaust pipe 120 extends outward in the vehicle width direction behind the occupant seats 11, thereafter is bent inward in the vehicle width direction substantially in the U shape, and then extends back substantially onto the center line CL of the vehicle body. This arrangement makes it possible to secure a required length of the exhaust pipe 120 by utilizing the dead space to elongate the exhaust pipe 120 even in, for example, the vehicle 1 having the lowered floor, in which the space in the rear of the vehicle body is limited with the internal combustion engine 13 disposed behind the occupant seats 11.

In addition, the exhaust pipe 120 extends outward in the vehicle width direction while being inclined in one of the upper and lower directions with respect to the horizontal plane, reaches the region behind the driver's seat 9 or the passenger seat 10, and thereafter, extends back substantially onto the center line CL of the vehicle body while being inclined in the other one of the upper and lower directions. This arrangement makes it possible to secure a required length of the exhaust pipe 120 by elongating the exhaust pipe 120 even in the vehicle 1 in which the internal combustion engine 13 is disposed behind the occupant seats 11 so as to limit the space in the rear of the vehicle body.

Moreover, the exhaust pipe 120 extends frontward from the internal combustion engine 13, then turns around and extends rearward, thereafter linearly extends outward in the vehicle width direction, is bent inward in the vehicle width direction, linearly extends back substantially onto the center line CL of the vehicle body, and finally is connected to the muffler 122 in the rear frame portion 4. This arrangement makes it possible to secure a required length of the exhaust pipe 120 by elongating the exhaust pipe 120. In addition, since the straight portion of the exhaust pipe 120 can be increased, the number of processing and assembling processes is reduced, so that an increase in the manufacturing cost of the exhaust pipe 120 can be suppressed.

In addition, after extending inward in the vehicle width direction, the exhaust pipe 120 passes a region closer to the center the vehicle body than the corresponding rear upright frame 76, and then extends back substantially onto the center line CL of the vehicle body. This arrangement makes it possible to efficiently utilize the dead space in the rear-wheel suspension system disposed in the rear frame portion 4 behind the rear upright frames 76.

Moreover, the outermost extending portion 121 of the exhaust pipe 120 extends to the region inside the rearward extension line of the corresponding side frame 51 and outside the corresponding rear upper frame 75 or the corresponding rear lower frame 33 in the vehicle width direction. This arrangement makes it possible to protect the exhaust pipe 120 while securing a sufficient length for the exhaust pipe 120.

Further, the outermost extending portion 121 of the exhaust pipe 120 is arranged in the region behind the driver's seat 9, which is different from the region behind the passenger seat 10, where the intake system for supplying air to the internal combustion engine 13 is arranged. This arrangement enables an effective layout efficiently utilizing the space behind the occupant seats 11, and also achieves a favorable weight balance between the left and right sides of the vehicle.

Furthermore, since the outermost extending portion 121 of the exhaust pipe 120 is arranged inward of a corresponding one of the rear wheels 15 in the vehicle width direction in a plan view, the exhaust pipe 120 can be protected.

A first embodiment of the present invention provides an exhaust pipe structure of a vehicle, including: a vehicle body frame including a front frame portion supporting a front-wheel drive system, a center frame portion including a space for occupants, and a rear frame portion supporting a rear-wheel drive system, the vehicle body frame constituting a vehicle body; a pair of occupant seats disposed side by side in a vehicle width direction in the center frame portion, the occupant seats constituting a driver's seat and a passenger seat; an internal combustion engine disposed behind the occupant seats and supported substantially on a center line of the vehicle body in the rear frame portion; an exhaust pipe being connected to the internal combustion engine and exhausting a combustion gas generated by combustion in the internal combustion engine; and a muffler connected to the exhaust pipe. Moreover, in the exhaust pipe structure of a vehicle, the exhaust pipe extends outward in the vehicle width direction behind the occupant seats, thereafter is bent inward in the vehicle width direction substantially in a U shape, and extends back substantially onto the center line of the vehicle body.

A second embodiment of the present invention provides the following characteristic in addition to the configuration of the first embodiment. Specifically, in the exhaust pipe structure of a vehicle, the exhaust pipe extends outward in the vehicle width direction while being inclined in one of upper and lower directions with respect to a horizontal plane, reaches any one of regions respectively behind the driver's seat and the passenger seat in the vehicle width direction, and thereafter, extends back substantially onto the center line of the vehicle body while being inclined in the other one of the upper and lower directions.

A third embodiment of the present invention provides the following characteristic in addition to the configuration of any one of the first and second embodiments. Specifically, in the exhaust pipe structure of a vehicle, the exhaust pipe extends frontward from the internal combustion engine, then turns around and extends rearward, thereafter linearly extends outward in the vehicle width direction, is bent inward in the vehicle width direction, linearly extends back substantially onto the center line of the vehicle body, and finally is connected to the muffler provided substantially on the center line of the vehicle body in the rear frame portion.

A fourth embodiment of the present invention provides the following characteristic in addition to the configuration of any one of the first to third embodiments. Specifically, the exhaust pipe structure of a vehicle further includes: a pair of lower frames each including a front lower frame, a center lower frame, and a rear lower frame, the lower frames being disposed respectively in left and right lower portions of the vehicle body and extending in a front-rear direction; a pair of left and right rear upper frames extending upward respectively from rear ends of the rear lower frames, thereafter being bent in such a manner as to cover the internal combustion engine, and extending frontward; a pair of rear upright frames each connecting one of the rear upper frames and a corresponding one of the lower frames; and a rear-wheel suspension system mounted to the rear frame portion. Moreover, in the exhaust pipe structure of a vehicle, the exhaust pipe extends outward in the vehicle width direction, thereafter passes a region closer to the center of the vehicle body than a corresponding one of the rear upright frames, and then extends back substantially onto the center line of the vehicle body.

A fifth embodiment of the present invention provides the following characteristic in addition to the configuration of any one of the first to fourth embodiments. Specifically, the exhaust pipe structure of a vehicle further includes a pair of left and right side frames extending in the front-rear direction outward of the center lower frames in the vehicle width direction. Moreover, in the exhaust pipe structure of a vehicle, an outer extending portion of the exhaust pipe extends to a region inside a rearward extension line of a corresponding one of the side frames in the vehicle width direction and outside any one of a corresponding one of the rear upper frames and a corresponding one of the rear lower frames in the vehicle width direction.

A sixth embodiment of the present invention provides the following characteristic in addition to the configuration of any one of the first to fifth embodiments. Specifically, in the exhaust pipe structure of a vehicle, while an intake system for supplying air to the internal combustion engine is arranged in one of regions respectively behind the driver's seat and the passenger seat, the outer extending portion of the exhaust pipe is arranged in the other one of the regions.

A seventh embodiment of the present invention provides the following characteristic in addition to the configuration of any one of the first to sixth embodiments. Specifically, in the exhaust pipe structure of a vehicle, the outer extending portion of the exhaust pipe is arranged inward of a corresponding one of rear wheels in the vehicle width direction in a plan view.

According to the first embodiment of the present invention, the exhaust pipe extends outward in the vehicle width direction behind the occupant seats, thereafter is bent inward in the vehicle width direction substantially in the U shape, and then extends back substantially onto the center line of the vehicle body. This arrangement makes it possible to secure a required length of the exhaust pipe by utilizing a dead space to elongate the exhaust pipe even in, for example, a vehicle having a lowered floor, in which a space in the rear of the vehicle body is limited with an internal combustion engine disposed behind occupant seats.

According to the second embodiment of the present invention, after extending outward in the vehicle width direction while being inclined in one of upper and lower directions with respect to the horizontal plane, the exhaust pipe extends back substantially onto the center line of the vehicle body while being inclined in the other one of the upper and lower directions. This arrangement makes it possible to secure a required length of the exhaust pipe by elongating the exhaust pipe even in a vehicle in which an internal combustion engine is disposed behind occupant seats so as to limit a space in the rear of the vehicle body.

According to the third embodiment of the present invention, the exhaust pipe extends frontward from the internal combustion engine, then turns around and extends rearward, thereafter linearly extends outward in the vehicle width direction, is bent inward in the vehicle width direction, linearly extends back substantially onto the center line of the vehicle body, and finally is connected to the muffler in the rear frame portion. This arrangement makes it possible to secure a required length of the exhaust pipe by elongating the exhaust pipe. In addition, since the straight portion of the exhaust pipe can be increased, the number of processing and assembling processes is reduced, so that an increase in the manufacturing cost of the exhaust pipe is suppressed.

According to the fourth embodiment of the present invention, the exhaust pipe extends outward in the vehicle width direction, thereafter passes the region closer to the center of the vehicle body than the corresponding one of the rear upright frames, and then extends back substantially onto the center line of the vehicle body. This arrangement makes it possible to effectively utilize the dead space in the rear-wheel suspension system disposed in the rear frame portion behind the rear upright frames.

According to the fifth embodiment of the present invention, the outer extending portion of the exhaust pipe extends to a region inside the rearward extension line of the corresponding side frame in the vehicle width direction and outside any one of the corresponding rear upper frame and the corresponding rear lower frame in the vehicle width direction. This arrangement makes it possible to protect the exhaust pipe while securing a sufficient length of the exhaust pipe.

According to the sixth embodiment of the present invention, while the intake system for supplying air to the internal combustion engine is arranged in one of the regions respectively behind the driver's seat and the passenger seat, the outer extending portion of the exhaust pipe is arranged in the other one of the regions. This arrangement enables an effective layout efficiently utilizing the space behind the occupant seats, and also achieves a favorable weight balance between the left and right sides of the vehicle.

According to the seventh embodiment of the present invention, since the outer extending portion of the exhaust pipe is arranged inward of the corresponding rear wheel in the vehicle width direction in the plan view, the exhaust pipe can be protected.

It should be noted that the present invention is not limited to the above-described embodiment, and modification, improvement, and the like may be made thereon as appropriate. For example, although the present invention has been described so far as being applied to an MUV (multi utility vehicle), the present invention is not limited to this but may be applied to any type of vehicle having four or more wheels in the same manner.

What is claimed as new and is desired to be secured by Letters Patent of the United States is:

1. An exhaust pipe structure for a vehicle, comprising:
   a vehicle body frame of a vehicle body, the vehicle body frame comprising a front frame portion, a center frame portion, and a rear frame portion, the front frame portion supporting a front-wheel drive system, the center frame portion providing a space for occupants, the rear frame portion supporting a rear-wheel drive system;
   a pair of occupant seats comprising a driver's seat and a passenger seat and disposed side by side in a vehicle width direction in the center frame portion;
   an internal combustion engine disposed behind the occupant seats and supported substantially on a center line of the vehicle body in the rear frame portion;
   an exhaust pipe which is connected to the internal combustion engine behind the occupant seats and through which a combustion gas generated by combustion in the internal combustion engine is exhausted, the exhaust pipe extending outward in the vehicle width direction from the internal combustion engine, thereafter, being bent substantially in a U-shape to extend inward in the vehicle width direction, and then extending substantially onto the center line of the vehicle body; and
   a muffler connected to the exhaust pipe,
   wherein the muffler is provided substantially on the center line of the vehicle body in the rear frame portion,
   wherein the exhaust pipe extends frontward from the internal combustion engine, then u-turns to extend rearward, and then is bent outward in the vehicle width direction so that the exhaust pipe linearly extends outward in the vehicle width direction, and
   wherein after being bent to extend inward in the vehicle width direction, the exhaust pipe linearly extends back substantially onto the center line of the vehicle body so that the exhaust pipe is connected to the muffler.

2. The exhaust pipe structure for a vehicle according to claim 1, further comprising:
   a pair of lower frames each comprising a front lower frame, a center lower frame, and a rear lower frame, the lower frames extending in a front-rear direction substantially orthogonal to the vehicle width direction and being disposed respectively in left and right lower portions of the vehicle body;
   a pair of left and right rear upper frames extending upward respectively from rear ends of the rear lower frames and thereafter being bent to extend frontward in such a manner that covers the internal combustion engine;
   a pair of rear upright frames each connecting the respective left and right rear upper frames and the respective lower frames; and
   a rear-wheel suspension system mounted to the rear frame portion,
   wherein the exhaust pipe extending inward in the vehicle width direction passes through a region in front of one of the rear upright frames.

3. The exhaust pipe structure for a vehicle according to claim 1,
   wherein an intake system for supplying air to the internal combustion engine is arranged in a first region located behind one of the driver's seat and the passenger seat, and wherein the exhaust pipe is arranged to pass through a second region located opposite to the first region in the vehicle width direction with respect to the center line of the vehicle body.

4. The exhaust pipe structure for a vehicle according to claim 1, wherein the exhaust pipe is arranged inward of a corresponding one of rear wheels in the vehicle width direction.

5. The exhaust pipe structure for a vehicle according to claim 1,
wherein the exhaust pipe extending outward in the vehicle width direction thereby passing through a region behind one of the driver's seat and the passenger seat is inclined in one of upper and lower directions with respect to a horizontal plane, and
wherein the exhaust pipe extending back substantially onto the center line of the vehicle body thereby passing through a region behind one of the driver's seat and the passenger seat is inclined in one of the upper and lower directions with respect to a horizontal plane.

6. An exhaust pipe structure for a vehicle, comprising:
a vehicle body frame of a vehicle body, the vehicle body frame comprising a front frame portion, a center frame portion, and a rear frame portion, the front frame portion supporting a front-wheel drive system, the center frame portion providing a space for occupants, the rear frame portion supporting a rear-wheel drive system;
a pair of occupant seats comprising a driver's seat and a passenger seat and disposed side by side in a vehicle width direction in the center frame portion;
an internal combustion engine disposed behind the occupant seats and supported substantially on a center line of the vehicle body in the rear frame portion;
an exhaust pipe which is connected to the internal combustion engine behind the occupant seats and through which a combustion gas generated by combustion in the internal combustion engine is exhausted, the exhaust pipe extending outward in the vehicle width direction from the internal combustion engine, thereafter, being bent substantially in a U-shape to extend inward in the vehicle width direction, and then extending substantially onto the center line of the vehicle body;
a muffler connected to the exhaust pipe;
a pair of lower frames each comprising a front lower frame, a center lower frame, and a rear lower frame, the lower frames extending in a front-rear direction substantially orthogonal to the vehicle width direction and being disposed respectively in left and right lower portions of the vehicle body;
a pair of left and right rear upper frames extending upward respectively from rear ends of the rear lower frames and thereafter being bent to extend frontward in such a manner that covers the internal combustion engine;
a pair of rear upright frames each connecting the respective left and right rear upper frames and the respective lower frames; and
a rear-wheel suspension system mounted to the rear frame portion,
wherein the exhaust pipe extending inward in the vehicle width direction passes through a region in front of one of the rear upright frames.

7. The exhaust pipe structure for a vehicle according to claim 6, further comprising:
a pair of left and right side frames extending substantially in the front-rear direction and disposed outward of the center lower frames in the vehicle width direction,
wherein the exhaust pipe passes through a region inside a rearward extension line of a corresponding one of the side frames in the vehicle width direction and outside any one of the left and right rear upper frames and the rear lower frames in the vehicle width direction.

8. The exhaust pipe structure for a vehicle according to claim 7,
wherein an intake system for supplying air to the internal combustion engine is arranged in a first region located behind one of the driver's seat and the passenger seat, and
wherein the exhaust pipe is arranged to pass through a second region located opposite to the first region in the vehicle width direction with respect to the center line of the vehicle body.

9. The exhaust pipe structure for a vehicle according to claim 7, wherein the exhaust pipe is arranged inward of a corresponding one of rear wheels in the vehicle width direction.

10. The exhaust pipe structure for a vehicle according to claim 6,
wherein an intake system for supplying air to the internal combustion engine is arranged in a first region located behind one of the driver's seat and the passenger seat, and
wherein the exhaust pipe is arranged to pass through a second region located opposite to the first region in the vehicle width direction with respect to the center line of the vehicle body.

11. The exhaust pipe structure for a vehicle according to claim 6, wherein the exhaust pipe is arranged inward of a corresponding one of rear wheels in the vehicle width direction.

12. The exhaust pipe structure for a vehicle according to claim 6,
wherein the exhaust pipe extending outward in the vehicle width direction thereby passing through a region behind one of the driver's seat and the passenger seat is inclined in one of upper and lower directions with respect to a horizontal plane, and
wherein the exhaust pipe extending back substantially onto the center line of the vehicle body thereby passing through a region behind one of the driver's seat and the passenger seat is inclined in one of the upper and lower directions with respect to a horizontal plane.

13. A vehicle comprising:
a front-wheel drive system;
a rear-wheel drive system;
a vehicle body frame of a vehicle body, the vehicle body frame comprising a front frame portion, a center frame portion, and a rear frame portion, the front frame portion supporting the front-wheel drive system, the center frame portion providing a space for occupants, the rear frame portion supporting the rear-wheel drive system;
a pair of occupant seats comprising a driver's seat and a passenger seat and disposed side by side in a vehicle width direction in the center frame portion;
an internal combustion engine disposed behind the occupant seats and supported substantially on a center line of the vehicle body in the rear frame portion;
an exhaust pipe which is connected to the internal combustion engine behind the occupant seats and through which a combustion gas generated by combustion in the internal combustion engine is exhausted, the exhaust pipe extending outward in the vehicle width direction from the internal combustion engine, thereafter, being bent substantially in a U-shape to extend inward in the vehicle width direction, and then extending back substantially onto the center line of the vehicle body; and a muffler connected to the exhaust pipe, wherein the muffler is provided substantially on the center line of the vehicle body in the rear frame portion, wherein the exhaust pipe extends frontward from the internal combustion engine, then u-turns to extend rearward, and then is bent outward in the vehicle width direction so that the exhaust pipe linearly extends outward in the vehicle width direction, and wherein after being bent to extend inward in the vehicle width direction, the exhaust pipe linearly extends back substantially onto the center line of the vehicle body so that the exhaust pipe is connected to the muffler.

14. The vehicle according to claim 13, wherein the exhaust pipe extending outward in the vehicle width direction thereby passing through a region behind one of the driver's seat and the passenger seat is inclined in one of upper and lower directions with respect to a horizontal plane, and wherein the exhaust pipe extending back substantially onto the center line of the vehicle body thereby passing through a region behind one of the driver's seat and the passenger seat is inclined in one of the upper and lower directions with respect to a horizontal plane.

15. A vehicle comprising:

a front-wheel drive system;

a rear-wheel drive system;

a vehicle body frame of a vehicle body, the vehicle body frame comprising a front frame portion, a center frame portion, and a rear frame portion, the front frame portion supporting the front-wheel drive system, the center frame portion providing a space for occupants, the rear frame portion supporting the rear-wheel drive system;

a pair of occupant seats comprising a driver's seat and a passenger seat and disposed side by side in a vehicle width direction in the center frame portion;

an internal combustion engine disposed behind the occupant seats and supported substantially on a center line of the vehicle body in the rear frame portion;

an exhaust pipe which is connected to the internal combustion engine behind the occupant seats and through which a combustion gas generated by combustion in the internal combustion engine is exhausted, the exhaust pipe extending outward in the vehicle width direction from the internal combustion engine, thereafter, being bent substantially in a U-shape to extend inward in the vehicle width direction, and then extending back substantially onto the center line of the vehicle body;

a muffler connected to the exhaust pipe;

a pair of lower frames each comprising a front lower frame, a center lower frame, and a rear lower frame, the lower frames extending in a front-rear direction substantially orthogonal to the vehicle width direction and being disposed respectively in left and right lower portions of the vehicle body;

a pair of left and right rear upper frames extending upward respectively from rear ends of the rear lower frames and thereafter being bent to extend frontward in such a manner that covers the internal combustion engine;

a pair of rear upright frames each connecting the respective left and right rear upper frames and the respective lower frames; and a rear-wheel suspension system mounted to the rear frame portion, wherein the exhaust pipe extending inward in the vehicle width direction passes through a region in front of one of the rear upright frames.

16. The vehicle according to claim 15, wherein the exhaust pipe extending outward in the vehicle width direction thereby passing through a region behind one of the driver's seat and the passenger seat is inclined in one of upper and lower directions with respect to a horizontal plane, and wherein the exhaust pipe extending back substantially onto the center line of the vehicle body thereby passing through a region behind one of the driver's seat and the passenger seat is inclined in one of the upper and lower directions with respect to a horizontal plane.

* * * * *